United States Patent [19]
Hayashi et al.

[11] Patent Number: 5,436,675
[45] Date of Patent: Jul. 25, 1995

[54] TELEVISION RECEIVER WITH UHF/VHF AND BROADCAST SATELLITE TUNERS, POWER SWITCH STATE DISPLAY ANTENNA RECEPTION LEVEL DISPLAY, AND EXTERNAL DECODER OUTPUT AND INPUT TERMINALS

[75] Inventors: Toshihide Hayashi, Kanagawa; Koki Tsumori, Tokyo; Takanobu Hizuka, Kanagawa, all of Japan

[73] Assignee: Sony Corporation, Tokyo, Japan

[21] Appl. No.: 240,494

[22] Filed: May 10, 1994

Related U.S. Application Data

[63] Continuation of Ser. No. 143,987, Oct. 27, 1993, abandoned, which is a continuation of Ser. No. 932,506, Aug. 20, 1992, abandoned.

[30] Foreign Application Priority Data

Aug. 30, 1991 [JP] Japan .................................. 3-244996

[51] Int. Cl.[6] .............................................. H04N 7/20
[52] U.S. Cl. .................................... 348/725; 348/569; 348/563
[58] Field of Search ............... 348/569, 725, 728, 731, 348/720, 734, 563

[56] References Cited

U.S. PATENT DOCUMENTS

| | | | |
|---|---|---|---|
| 4,858,006 | 8/1989 | Suzuki et al. | 358/190 |
| 4,903,130 | 2/1990 | Kitagawa et al. | 358/190 |
| 5,134,486 | 6/1993 | Suzuki et al. | 358/190 |
| 5,251,034 | 10/1993 | Kurita et al. | 348/725 |

FOREIGN PATENT DOCUMENTS

| | | | |
|---|---|---|---|
| 2-89486 | 3/1990 | Japan | H04N 7/200 |
| 3-38190 | 2/1991 | Japan | H04N 7/200 |
| 2221363 | 1/1990 | United Kingdom | H04N 5/50 |

*Primary Examiner*—Victor R. Kostak
*Assistant Examiner*—Nathan J. Flynn
*Attorney, Agent, or Firm*—Jay H. Maioli

[57] ABSTRACT

A television receiver capable of displaying the condition, i.e., ON or OFF, of the power supply which supplies electric power to an external BS (broadcasting satellite) reception converter, together with the reception level at the BS antenna. The level at the antenna is detected by a level detector circuit (27) according to the output from a BS tuner (23) and displayed on the CRT (36). A power supply circuit (20) which supplies electric power to the external BS converter is switched on by a power switch (46). A system controller (41) detects the condition of this power switch and displays this condition together with the antenna reception level.

1 Claim, 2 Drawing Sheets

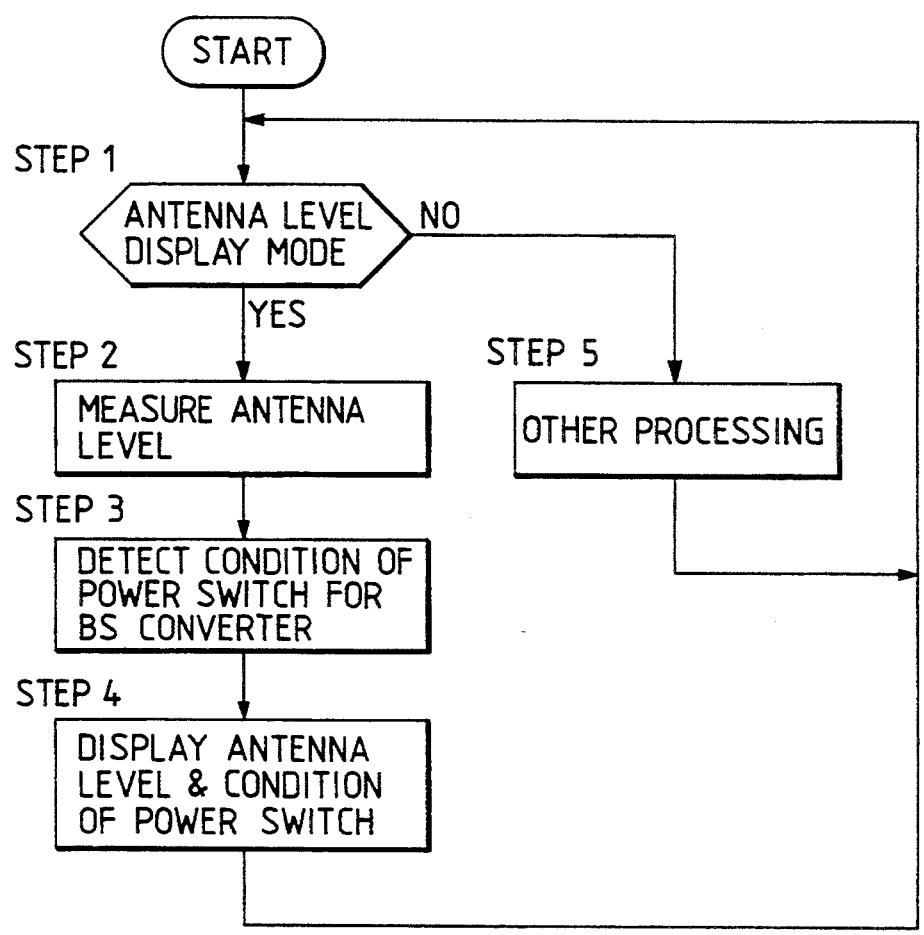

TELEVISION RECEIVER WITH UHF/VHF AND BROADCAST SATELLITE TUNERS, POWER SWITCH STATE DISPLAY ANTENNA RECEPTION LEVEL DISPLAY, AND EXTERNAL DECODER OUTPUT AND INPUT TERMINALS

This is a continuation of application Ser. No. 08/143,987 filed Oct. 27, 1993 abandon, which was a continuation of 07/932,506 filed Aug. 20, 1992 now abandon.

FIELD OF THE INVENTION

The present invention relates to a television receiver which incorporates both a power supply means for supplying electric power to an external converter used for reception of broadcasts using broadcasting satellites and a broadcasting satellite broadcast reception tuner and which displays a picture according to the output signal of the selected channel from the tuner on the display portion.

BACKGROUND OF THE INVENTION

Today, TV channels which are utilizing broadcasting satellites (BS) in Japan include BS-5 channel (Japan Satellite Broadcasting), BS-7 channel (NHK (Japan Broadcasting System)), and BS-11 channel (NHK). Also, TV programs and music programs using communications satellites (CS) have just begun in Japan.

In order to enjoy a TV program of a BS broadcast or a music program of a CS broadcast, a dedicated reception system is needed. For example, a satellite broadcast reception system for receiving BS broadcasts consists essentially of a BS antenna, a BS converter, and a BS tuner. The BS antenna efficiently gathers feeble electromagnetic waves from satellites and supplies them to the BS converter. Parabolic antennas are extensively used in civil applications. The BS converter amplifies signals in 12 GHz band received by the BS antenna and converts them into signals in 1 GHz band. The BS tuner selects the signal of the desired channel from the output signal from the BS converter, subjects the signal of the selected channel to signal processing (e.g., AGC (automatic gain control), IF amplification, FM demodulation, deamphasis, and energy dispersion-and-removal), and produces a picture signal and a sound signal. The picture and sound signals obtained from the BS tuner in this way are supplied to the BS tuner. Thus, programs of the BS broadcasts can be watched. Also, TV receivers incorporating a BS tuner are commercially available.

In BS and CS broadcasts, the viewer cannot directly enjoy some of the programs of the channel selected by the BS tuner described above. Examples are high-definition TV programs broadcast in certain time zones in BS-11 channel (in Japan), pay broadcast programs in BS-5 channel, and pay CS broadcast programs.

More specifically, the high-definition TV program is being broadcast, using a so-called MUSE signal. For pay broadcast programs, picture signals and sound signals are scrambled. Therefore, in order to watch the high-definition broadcast program, a MUSE decoder for decoding the MUSE signal and a down-converter for converting the high-definition picture signal from the MUSE decoder into a picture signal conforming to the NTSC standards are needed. The MUSE decoder and the down-converter are hereinafter collectively referred to as the MUSE down-converter. In order to watch pay broadcast programs, a descrambler (hereinafter referred to as the decoder) is necessitated.

In particular, to enjoy the high-definition broadcast program, the BS tuner is tuned to BS-11 channel, for example. The signal of the selected channel is supplied to the external MUSE down-converter connected with this TV receiver. Then, the signal from the MUSE down-converter which conforms to the NTSC standards is required to be fed back to the BS TV receiver. In order to watch pay broadcast programs, the BS tuner is tuned to BS-5 channel, for example. The signal of the selected channel is supplied to the external decoder. The descrambled signal from the decoder must be furnished back to the BS TV receiver.

Usually, the above-described MUSE down-converter and decoder are supplied as adaptors which are connected with BS tuners or TV receivers incorporating a BS tuner in order that only viewers who want get the devices, connect them to the tuners or TV receivers, and use them.

The BS converter is generally installed close to the BS antenna. For a BS broadcast reception system for an individual viewer, the BS converter is supplied with electric power from the BS tuner to power the converter. For a BS broadcast reception system for a group of users, the common BS converter is supplied with electric power from a dedicated power supply to power the converter. Accordingly, a commercially available BS tuner or TV receiver having a BS tuner has a power supply circuit capable of switching on and off the power supply for the BS converter. In this way, the tuners and receivers can be used for both types of reception system.

In order for the BS reception system to obtain high picture quality in receiving a broadcast program, it is necessary that the BS broadcast signal received via the BS antenna be in excess of a given level. Commercially available BS tuners and TV receivers having a BS tuner are capable of detecting the level of the BS broadcast signal and displaying it as the antenna level. This function of displaying the antenna level can also be used to adjust the orientation of the BS antenna when it is installed. That is, BS antennas generally are highly unidirectional to secure high gain. Therefore, when the antenna is installed, it is necessary to accurately adjust the angle to the broadcasting satellite. The angle is adjusted by making use of the above-described function of displaying the antenna level, to accomplish the maximum antenna level.

As described previously, the conventional television receiver having a BS tuner has a power supply circuit capable of switching on and off the power supply for the BS converter so that the receiver can be employed for both kinds of satellite broadcast reception system, i.e., for an individual user and for a group of users. Where the TV receiver is used for a BS broadcast reception system for an individual user, if the electric power from the power supply circuit that powers the BS converter is cut off by erroneously setting the condition of the switch of the power supply circuit, then it is impossible to receive satellite broadcasts. Since the condition of this switch of the power supply circuit is set only once upon connection with the BS converter, the switch is installed on the rear surface of the apparatus. Hence, it is difficult to check the condition of the switch. Furthermore, if it is operated incorrectly, the incorrect operation often remains unnoticed.

SUMMARY OF THE INVENTION

It is an object of the present invention to provide a television receiver which incorporates both a power supply means for supplying electric power to an external satellite broadcast reception converter connected to the outside of the receiver and a satellite broadcast reception tuner and which displays a picture on its display portion according to the output signal of the selected channel from the tuner, the receiver being characterized in that it can certainly prevent erroneous setting of the output power from the power supply means. For this purpose, the receiver displays the information about the output power from the power supply means, i.e., whether the output is ON or OFF, together with the antenna level on the viewing screen.

The above object is achieved in accordance with the teachings of the invention by a television receiver comprising: a power supply means for supplying electric power to an external satellite broadcast reception converter connected to the outside of the receiver; a satellite broadcast reception tuner; a display portion on which a picture according to the output of the selected channel from the tuner is displayed; a switch means capable of cutting off the electric power supplied from the power supply means to the converter; an antenna level detection means for detecting the reception level at a BS antenna connected to the converter according to the output of the selected channel from the tuner; and a display control means which, when the reception level at the antenna is being displayed on the display portion, displays information indicating whether the switch means is cutting off the electric power on the picture on which the antenna level is displayed.

Other objects and features of the invention will become obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWINGS

FIG. 2 is á flowchart illustrating á series of operations performed to establish an antenna level display mode under the control of a system controller incorporated in the receiver shown in FIG. 1.

DETAILED DESCRIPTION OF THE INVENTION

Figure 1:
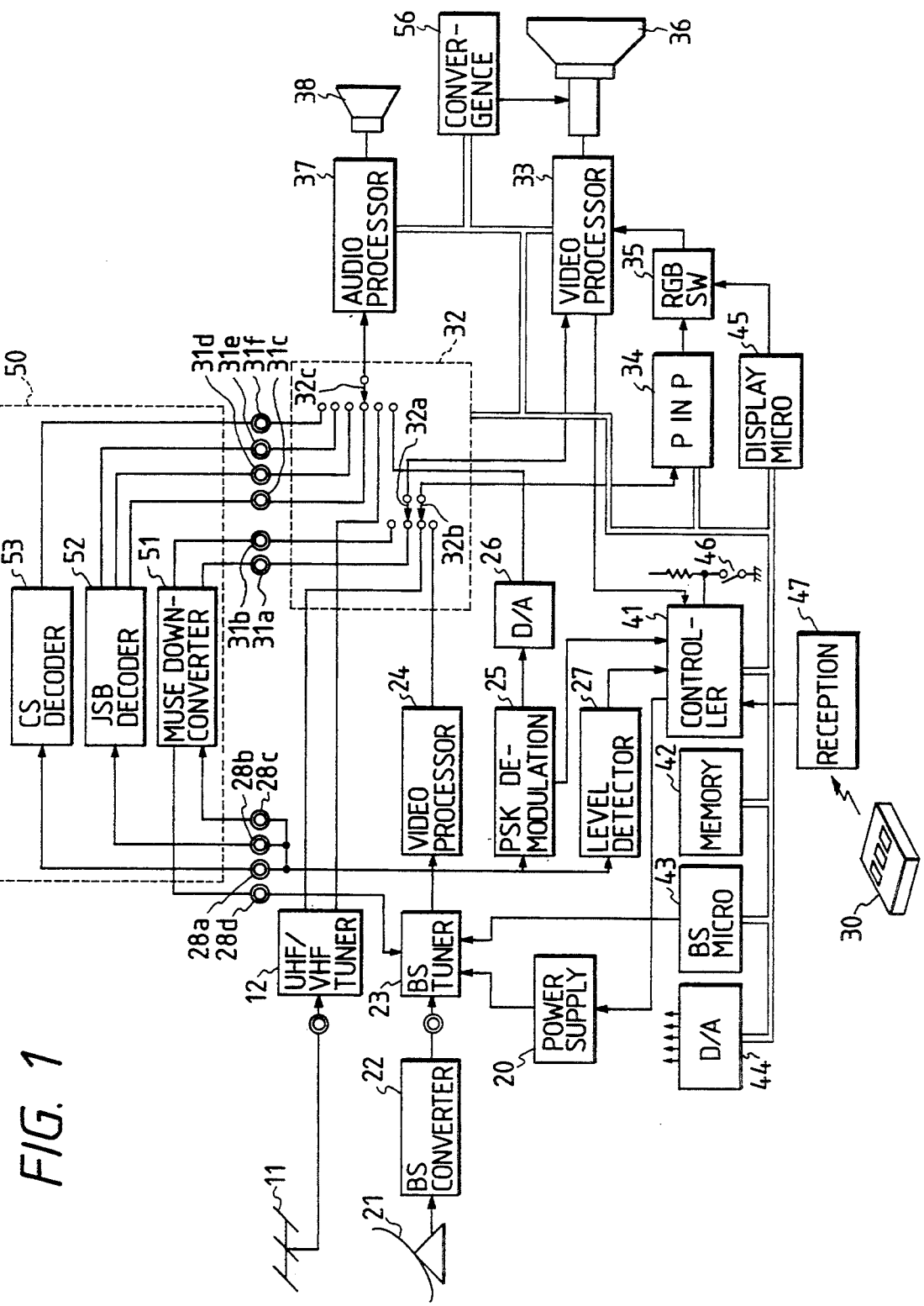
FIG. 1 is a block diagram of á television receiver according to the invention.

Referring to FIG. 1, there is shown a television receiver embodying the concept of the present invention. This receiver incorporates a VHF/UHF tuner 12 for receiving terrestrial broadcasts, á BS tuner 23 for receiving BS broadcasts, and a power supply circuit 20 for supplying electric power to an external BS converter 22 connected with the BS tuner 23. An external decoder 50 which decodes the encoded output signal of the selected channel from the BS tuner 23 is attached to the receiver. Sound is produced from a loudspeaker 38 in response to the sound signal contained in the output signal from the VHF/UHF tuner 12, in the output signal from the BS tuner 23, or in the output signal from the decoder 50. A picture according to the color TV signal is displayed on a cathode-ray tube (CRT) 36.

In this television receiver, the VHF/UHF tuner 12 is adapted to receive terrestrial broadcasts and acts as a terrestrial broadcast reception portion which selects the signal of the desired channel from the VHF or UHF terrestrial broadcast signals and reproduces the color television signal and the sound signal conforming to the NTSC standards. For example, an external VHF/UHF antenna 11 consisting of a Yagi(Uda) antenna is connected to the tuner 12. This tuner 12 selects the signal of the desired channel from the VHF or UHF terrestrial broadcast signals received via the antenna 11, processes the signal of the selected channel (e.g., amplifies and detects the signal), and reproduces the color television signal and the sound signal. Of the color TV signal and sound signal of the channel selected by the VHF/UHF tuner 12, the color TV signal is supplied to the CRT 36 via an AV switch 32 and via a video processor circuit 33. The sound signal is supplied to the loudspeaker 38 via the AV switch 32 and via an audio processor circuit 37.

The BS tuner 23 adapted to receive satellite broadcasts serves as a satellite broadcast reception portion which selects the signal of a desired channel either from satellite broadcasts (hereinafter referred to as the BS broadcasts) using broadcasting satellites (BS) or from satellite broadcasts (hereinafter referred to as the CS broadcasts) using communications satellites (CS) and reproduces color TV signal and sound signal conforming to the NTSC standards. The external BS converter 22 for reception of satellite broadcasts is connected to the BS tuner 23 via coaxial cable. A BS antenna 21 consisting of a parabolic antenna is connected to the BS converter 22.

The BS converter 22 receives signals in 12 GHz band of BS broadcasts coming from a BS or CS satellite in the form of feeble electromagnetic waves, via the BS antenna 21, amplifies the received signals, converts them into BS-IF signals in 1 GHz band, and supplies these BS-IF signals to the BS tuner 23.

In this embodiment, the television receiver constitutes a satellite broadcast reception system for an individual user. Electric power is supplied from the power supply circuit 20 to the BS tuner 23 via the coaxial cable. The operation of the power supply circuit 20 is controlled by a system controller 41 to which a power switch 46 is connected. The supply of the electric power is enabled or inhibited according to the setting of the power switch 46. In this satellite broadcast reception system for an individual user, the power switch 46 is so set that the power supply circuit 20 supplies the electric power. If this satellite broadcast reception system is used for a group of users, the power switch 46 is so set that the electric power from the power supply circuit 20 is cut off.

The BS tuner 23 selects the signal of a desired channel (e.g., BS-5 channel (Japan Satellite Broadcast), BS-7 channel (NHK), BS-11 channel (NHK), or a CS broadcast from the output signal from the BS converter 22, subjects the signal of the selected channel to signal processing (e.g., AGC (automatic gain control), IF amplification, FM demodulation, deamphasis, and energy dispersion-and-removal), reproduces a picture signal and a sound signal that is modulated by phase-shift keying (PSK) and pulse code modulation (PCM).

The picture signal and the PCM sound signal of the channel selected by this BS tuner 23 are supplied to the external decoder 50 via external output terminals 28a–28c. The picture signal is fed to the video processor circuit 24. The PCM sound signal is furnished to a PSK demodulator 25.

The video processor circuit 24 converts the picture signal of the channel selected by the BS tuner 23 into á color TV signal conforming to the NTSC standards. The color TV signal obtained by this video processor circuit 24 is supplied to the CRT 36 via both AV switch 32 and video processor circuit 33.

The PSK demodulator 25 demodulates the PSK-modulated, PCM sound signal of the channel selected by the BS tuner 23 and reproduces a PCM sound signal. Also, the demodulator 25 senses whether this PCM sound signal is scrambled or not. The PCM sound signal demodulated by the PSK demodulator 25 is converted into an analog sound signal by a digital-to-analog converter 26. The sound signal from this D/A converter 26 is fed to the loudspeaker 38 via both AV switch 32 and audio processor circuit 37. The output signal from the demodulator 25 which indicates whether the PCM sound signal is scrambled or not is supplied to the system controller 41 described above.

The signal of the channel selected by the BS tuner 23 is supplied to a level detector circuit 27. This detector circuit 7 detects the reception level at the BS antenna 21, i.e., the antenna level, according to the level of the signal in 8 MHz band of the channel selected by the BS tuner 23. The output signal of this level detector circuit 27 is supplied to the system controller 41.

Where the received satellite broadcast is a high-definition TV broadcast program or a pay broadcast program, i.e., when the received signal is a MUSE signal or a scrambled signal, the external decoder 50 converts, or decodes, the signal from the BS tuner 23 into a color TV signal and a sound signal which conform to the NTSC standards and are not scrambled. The decoder 50 comprises a MUSE down-converter 51 connected with the external output terminal 28c and with external input terminals 28d, 31a,31c, a JSB decoder 52 connected with the external output terminal 28b and with external input terminals 31b, 31d, 31e, and a CS decoder 53 connected with the external output terminal 28a and with an external input terminal 31f.

The MUSE down-converter 51 supplies given keyed AFC pulses to the BS tuner 23 via the external input terminal 28d in a mode in which a MUSE signal is received. The converter 51 decodes the MUSE signal supplied from the BS tuner 23 via the external output terminal 28c to reproduce a high-definition TV signal, then converts it into a color TV signal conforming to the NTSC standards, and decodes the received PCM sound signal encoded by DPCM audio near-instantaneous compressing and expanding and time-division multiplexed during the vertical retrace periods to reproduce the sound signal. The color TV signal and sound signal obtained from this down-converter 51 are supplied to the AV switch 32 via the external input terminals 31a, 31c. The color TV signal is supplied to the CRT 36 via both AV switch 32 and video processor circuit 33. The sound signal is fed to the loudspeaker 38 via both AV switch 32 and audio processor circuit 37.

The JSB decoder 52 descrambles the scrambled picture signal supplied from the BS tuner 23 via the external output terminal 28b to reproduce a color TV signal, demodulates the received PSK-modulated, scrambled PCM sound signal multiplexed with the picture signal by frequency-division multiplexing, then descrambles the scrambled PCM sound signal to reproduce the sound signal. The color TV signal and sound signal derived by the JSB decoder 52 are supplied to the AV switch 32 via the external input terminals 31b, 31d, 31e.

The color TV signal is supplied to the CRT 36 via both AV switch 32 and video processor circuit 33. The sound signal is fed to the loudspeaker 38 via both AV switch 32 and audio processor circuit 37.

The CS decoder 53 demodulates the PSK-modulated, scrambled PCM sound signal supplied from the BS tuner 23 via the external output terminal 28a, then descrambles the scrambled PCM sound signal to reproduce a sound signal. The sound signal produced from the CS decoder 53 is supplied to the AV switch 32 via the external input terminal 31f and then to the loudspeaker 38 via the audio processor circuit 37.

The AV switch 32 comprises a selector switch 32a for selecting one of the color TV signals to be supplied to the video processor circuit 33, a selector switch 32b for selecting the color TV signals to be supplied to a picture-in-picture processing circuit 34, and a selector switch 32c for selecting the sound signal to be supplied to the audio processor circuit 37.

The selector switch 32a selects one of color TV signals received from the MUSE down-converter 51 and from the JSB decoder 52 via the external input terminals 31a and 31b, respectively, and color TV signals from the VHF/UHF tuner 12 and from the video processor circuit 24, and supplies the selected one to the video processor circuit 33. The selector switch 32b selects one of color TV signals received from the MUSE down-converter 51 and from the JSB decoder 52 via the external input terminals 31a and 31b, respectively, and color TV signals from the VHF/UHF tuner 12 and the video processor circuit 24, and supplies the selected one to the picture-in-picture processing circuit 34.//The selector switch 32c selects one of sound signals supplied from the MUSE down-converter 51, the JSB decoder 52, and the CS decoder 53 via the external input terminals 31c–31f, respectively, and sound signals supplied from the VHF/UHF tuner 12 and the D/A converter 26, and supplies the selected one to the audio processor circuit 37.

The video processor circuit 33 includes a video amplifier circuit and a chrominance signal-reproducing circuit and acts to convert the color TV signal selected by the AV switch 32 into three primary color signals which are supplied to the CRT 36. The video processor circuit 33 senses whether the color TV signal selected by the AV switch 32 conforms to the NTSC standards. The output signal from this video processor circuit 33 is fed to the system controller 41.

The picture-in-picture processing circuit 34 performs processing for providing a picture-in-picture display, i.e., the color TV signal selected by the AV switch 32 is visualized on a mini viewing screen formed on a part of the viewing screen of the CRT. The picture-in-picture processing circuit 34 supplies three primary color signals for displaying the mini screen to the video processor circuit 33 via an RGB switch circuit 35. The RGB switch circuit 35 switches between the three primary color signals from the picture-in-picture processing circuit 34 and three primary color signals delivered from a display microcomputer (display micro) 45 controlled by the system controller 41 and supplies the selected signals to the video processor circuit 33. The latter three primary color signals are used to display the antenna level and the contents of manual operations.

The picture-in-picture processing circuit 34 displays the picture of the selected channel on the CRT 36 and produces the sound of the selected channel from the loudspeaker 38 under the control of the system controller 41. If necessary, the picture-in-picture processing circuit 34 provides a picture-in-picture display, displays the condition of the TV receiver such as the antenna level, and contents of operations performed to record programs (hereinafter referred to as the menu).

The AV switch 32, the video processor circuit 33, the picture-in-picture processing circuit 34, the audio processor circuit 37, the display microcomputer 45, etc. are connected with the system controller 41 via I$^2$C buses. Also, a memory 42, a BS microcomputer (BS micro) 43, a D/A converter 44, and a digital convergence circuit 56 are connected via the I$^2$C buses.

The memory 42 consists of á nonvolatile memory, for example, and stores programs about the contents of control operations. The BS microcomputer 43 controls the tuning of the BS tuner 23 according to the data from the system controller 41. The D/A converter 44 converts the data from the system controller 41 into analog form and controls the volume (not shown) for controlling the intensity of sound. The digital convergence circuit 56 controls the deflection of the CRT 36 according to the data from the system controller 41.

A reception circuit 47 which receives a control signal from a remote controller 30 is connected with the system controller 41. This system controller 41 controls the various portions, depending on the control signals from a manual operation section (not shown) installed on the front surface of this television receiver and from the remote controller 30, on whether the picture signal and the PCM sound signal from the PSK demodulator 25 are scrambled or not, on the reception level detected by the level detector circuit 27, and on the presence or absence of a color TV signal from the video processor circuit 33.

If the user performs an operation, using the remote controller 30, e.g., to set the channel to BS-7 channel, the system controller 41 selects the BS-7 channel of the satellite broadcast and controls various portions so that the picture is displayed on the CRT 36 and that the sound of this channel is produced from the loudspeaker 38. As an example, when the user has set the channel to BS-5 channel, the system controller 41 determines whether the PCM sound signal of the BS-5 channel is scrambled or not. If the signal is scrambled, i.e., the broadcast is a pay program, then the system controller 41 once sends the picture signal from the BS tuner 23 to the JSB decoder 52, where the signal is decoded, i.e., descrambled color TV signal and sound signal are selected by the AV switch 32. The picture of this channel is displayed on the CRT 36. The sound of this channel is produced from the speaker 38. If the signal is not scrambled, i.e., the broadcast is a free program, then the color TV signal and the sound signal from the video processor circuit 24 are selected by the AV switch 32. The controller 41 controls various portions such that the picture of this channel is displayed on the CRT 36 and that the sound signal of this channel is produced from the speaker 38. If the user performs an operation to display a picture-in-picture display as the need arises, the system controller 41 controls both AV switch 32 and the picture-in-picture processing circuit 34 so that a BS broadcast program is displayed on the main viewing screen and that a terrestrial broadcast program is displayed on the mini viewing screen. If the user performs an operation for displaying the menu as the need arises, the system controller 41 controls the display microcomputer 45 in such a way that the order of manual operations performed to record BS broadcast programs is displayed within the mini viewing screen in the form of a menu.

More specifically, when the user sets the channel number, using the remote controller 30, to watch programs of the desired channel of a terrestrial broadcast, for example, the system controller 41 receives the control signal indicating the channel number from the remote controller 30 via its reception circuit 47. The system controller 41 controls the VHF/UHF tuner 12 so as to select the signal of the set channel. Also, the controller 41 controls the selector switches 32a and 32c of the AV switch 32 so as to select the color TV signal and the sound signal from the tuner 12. The selected color TV signal is supplied to the video processor circuit 33, while the sound signal is sent to the audio processor circuit 37.

The video processor circuit 33 converts the color TV signal from the selector switch 32 into three primary color signals and supplies these signals to the CRT 36. The audio processor circuit 37 processes the sound signal from the AV switch 32, e.g., adjusts the sound quality, and supplies the signal to the loudspeaker 38. As a result, the user can watch programs of the desired channel of a terrestrial broadcast.

At this time, the system controller 41 supplies data indicating the channel number to the display microcomputer 45 via the I$^2$C buses to permit the user to check the contents of the manual operation, e.g., the set channel number. In response to this data, the display microcomputer 45 supplies three primary color signals to the video processor circuit 33 via the RGB switch circuit 35 to display the channel number at the right upper corner, for example, of the viewing screen. The video processor circuit 33 converts the color TV signal from the AV switch 32 into three primary color signals and superimposes the three primary color signals from the RGB switch circuit 35 on the converted three primary color signals. As a result, the channel number is superimposed on the picture of the terrestrial broadcast program.

If the user next sets the channel to the BS-11 channel, using the remote controller 30, to watch programs of the desired channel of a BS broadcast, the system controller 41 receives a control signal indicating the channel number from the remote controller 30 via the reception circuit 47, controls the BS tuner 23 so as to be tuned to the signal of the BS-11 channel, and senses whether the present program is an ordinary broadcast program conforming to the NTSC standards or a high-definition broadcast program according to step-out of the PCM sound signal from the PSK demodulator 25 and according to the reception level at the level detector circuit 27. If the present program is an ordinary broadcast program, the color TV signal from the video processor circuit 24 is selected and, at the same time, the system controller controls the AV switch 32 so as to select the TV sound signal from the D/A converter 26. On the other hand, if the present program is a high-definition broadcast program, the system controller controls the AV switch 32 so as to select the color TV signal and sound signal from the MUSE down-converter 51.

Specifically, the sound signal of the ordinary broadcast program is converted into a PCM sound signal. Also, the sound signal is PSK-modulated and multiplexed with the picture signal by frequency-division multiplexing. The sound signal from the high-definition program is converted into a PCM sound signal by DPCM audio near-instantaneous compressing and expanding techniques and time-division multiplexed during the vertical retrace periods. As an example, if the tuned program is received well, i.e., the reception level at the level detector circuit 27 is large, and if the PCM sound signal is synchronized by the PSK demodulator 25, then the system controller 41 determines that the present program is an ordinary broadcast program. In this case, the system controller controls the selector switches 32a and 32c if the AV switch 32 so as to select the color TV signal from the video processor circuit 24 and to select the sound signal from the D/A converter 26. On the other hand, in the case of a high-definition broadcast program, the system controller controls the selector switches 32a and 32c of the AV switch 32 so as to select the color TV signal and the sound signal from the MUSE down-converter 51. The system controller may determine whether the present program is an ordinary broadcast program or a high-definition program according to the presence or absence of the keyed AFC pulses supplied to the BS tuner 23 from the MUSE down-converter 51 via the external input terminal 28d.

The selected color TV signal is supplied to the video processor circuit 33, while the sound signal is sent to the audio processor circuit 37. As a result, the user can watch automatically either an ordinary broadcast program or a high-definition broadcast program simply by setting the channel to the desired channel, irrespective of the kind of the BS broadcast program, i.e., whether it is an ordinary program or a high-definition broadcast program.

More specifically, today's high-definition broadcast programs share the same channel with ordinary broadcast programs but both kinds of programs are broadcast in different periods of time. For instance, the system controller determines whether the present program is an ordinary broadcast program or a high-definition broadcast program, depending on the presence or absence of the keyed AFC pulses, on the reception level at the level detector circuit, or on step-out of the PCM sound signal. If it is an ordinary broadcast program, the system controller selects the color TV signal from the video processor circuit 24 and the sound signal from the D/A converter 26. If it is a high-definition broadcast program, the system controller provides such a control that the color TV signal and the sound signal obtained by decoding by means of the MUSE down-converter 51 connected to the outside are automatically selected. This allows the user to watch an ordinary broadcast program or a high-definition broadcast program simply by tuning the BS tuner 23 to the desired channel, irrespective of the kind of the BS broadcast program.

If necessary, the user may operate the remote controller 30 to display the picture of a terrestrial broadcast program on the mini viewing screen while watching a BS broadcast program, as described above. If so, the system controller 41 receives a control signal corresponding to this operation indicating a picture-in-picture display from the remote controller 30 via the reception circuit 47. The controller controls the VHF/UHF tuner 12 so as to be tuned to the signal of the set channel of the terrestrial broadcast. Also, the system controller controls the selector switch 32b of the AV switch 32 to select the color TV signal from this tuner 12. The selected color TV signal is supplied to the picture-in-picture processing circuit 34. The picture-in-picture processing circuit 34 converts the color TV signal into three primary color signals, and supplies them as signals for the mini viewing screen to the video processor circuit 33 via the RGB switch circuit 35. Consequently, the user can watch the BS broadcast program on the main screen and the terrestrial broadcast program on the mini screen.

As an example, when the user has set the channel to BS-5 channel, using the remote controller 30, the system controller 41 receives the control signal indicating the channel number from the remote controller 30 via the reception circuit 47. The controller 41 controls the BS tuner 23 so as to select the signal of the set channel. Also, the controller 41 senses whether the present program is a free broadcast program not scrambled or a pay broadcast program scrambled, depending on whether the PCM sound signal from the PSK demodulator 25 is scrambled or not. If the program is a free broadcast program, then the controller 41 controls the AV switch 32 so as to select the color TV signal from the video processor circuit 24 and to select the sound signal from the D/A converter 26. If the program is a pay broadcast program, the controller 41 controls the AV switch 32 so as to select the color TV signal and the sound signal from the JSB decoder 52.

More specifically, the sound signal of a free broadcast program is converted into a PCM sound signal as described above and PSK-modulated and multiplexed with the picture signal by frequency-division multiplexing. The sound signal of a pay broadcast program is converted into a PCM sound signal, then scrambled, and PSK-modulated and multiplexed with the picture signal by frequency-division multiplexing. The system controller 41 determines whether the present program is a pay broadcast program or a free broadcast program according to the eighth bit of a range of bits indicating whether the PCM sound signal detected by the PSK demodulator 25 is scrambled or not. If the program is a free broadcast program, the controller controls the selector switches 32a and 32c of the AV switch 32 so as to select the color TV signal from the video processor circuit 24 and the sound signal from the D/A converter 26. On the other hand, if the program is a pay broadcast program, the controller controls the selector switches 32a and 32c of the AV switch 32 so as to select the color TV signal and the sound signal from the JSB decoder 52. The decision to determine whether the program is a pay broadcast program or a free broadcast program is made according to the twelfth bit of a so-called range of control bits of the PCM sound signal indicating whether the picture signal is scrambled or not.

The selected color TV signal is supplied to the video processor circuit 33. The sound signal is supplied to the audio processor circuit 37. As a result, the user can watch a free broadcast program or a pay broadcast program simply by setting the channel to a desired one, irrespective of whether the program is scrambled or not.

Then, if the user sets the channel to a channel of a CS broadcast by the use of the remote controller 30 to enjoy music programs of the desired channel of the CS broadcast, then the system controller 41 receives a control signal indicating the channel number from the remote controller 30 via the reception circuit 47, controls the BS tuner 23 so as to be tuned to the signal of the established channel, and senses whether the present music program is a free broadcast program not scrambled or a pay broadcast program scrambled, depending on whether the PCM sound signal from the PSK demodulator 25 is scrambled or not. If the present program is a free broadcast program, then the system controller controls the AV switch 32 so as to select the sound signal from the D/A converter 26. On the other hand, if the present program is a pay broadcast program, the system controller controls the AV switch 32 so as to select the sound signal from the CS decoder 53.

In particular, as mentioned above, the sound signal of a free broadcast program is converted into a PCM sound signal, PSK-modulated, and multiplexed by frequency-division multiplexing techniques. The sound signal of a pay broadcast program is converted into a PCM sound signal, then scrambled, PSK-modulated, and multiplexed by frequency-division multiplexing techniques. The system controller 41 determines whether the present program is a pay broadcast program or a free broadcast program according to the eighth bit of a range of bits indicating whether the PCM sound signal detected by the PSK demodulator 25 is scrambled or not. If the present program is a free broadcast program, the system controller controls the selector switch 32c of the AV switch 32 so as to select the sound signal from the D/A converter 26. If the program is pay broadcast program, the controller controls the selector switch 32c of the AV switch 32 so as to select the sound signal from the CS decoder 53.

The selected sound signal is supplied to the audio processor circuit 37. The result is that the user can listen to music either of a free broadcast program or of a pay broadcast program simply by setting the channel to the desired channel, irrespective of the kind of the broadcast program, i.e., whether it is a free program or a pay program.

In this television receiver, the system controller 41 makes a decision to see whether the antenna level display mode has been established (step 1 of the flowchart of FIG. 2). If the result of this decision is YES, i.e., the antenna level display mode has been established, then the antenna level is measured (step 2). Then, the condition of the power switch 46 for the BS converter is detected (step 3). According to the detected condition, "ON" or "OFF" is displayed. Also, the display microcomputer 45 displays the antenna level display screen so as to indicate the antenna level (step 3). If the result of the decision in step 1 is NO, i.e., the antenna level display mode is not established, other processing is performed.

For example, when the user is watching BS broadcast program as described above, if he or she performs an operation to indicate the antenna level by the use of the remote controller 30, the system controller 41 supplies data indicating the condition of the power switch 46 for the BS converter to the display microcomputer 45 via the I²C buses together with the output signal from the level detector circuit 27 indicating the reception level of the BS antenna 21, i.e., data about the antenna level, when the controller 41 receives the antenna level display control signal from the remote controller 30 via the reception circuit 47. In response to this data, the display microcomputer 45 supplies three primary color signals to the video processor circuit 33 via the RGB switch circuit 35 to display the antenna level and the condition of the BS converter power switch 46 at the right upper corner, for example, on the viewing screen. The video processor circuit 33 converts the color TV signal from the AV switch 32 into three primary color signals as described above and superimposes the three primary color signals from the RGB switch circuit 35 on the converted three primary color signals. As a result, the condition of the power switch 46 for the BS converter is superimposed on the picture of the BS broadcast program along with numerical values indicating the antenna level.

As described above, in this embodiment of television receiver, when the antenna level display mode is established, the word "ON" or "OFF" indicating the state of the power switch 46 for the BS converter is displayed together with the antenna level. Hence, the present condition of the power switch 46 can be easily known.

When the BS antenna is installed, the antenna level display mode is always established. In this mode, the condition of the power switch 46, i.e., ON or OFF of the output from the power supply circuit 20 for the BS converter, á is displayed together with the antenna level. This assures that erroneous setting of the power switch 46 is prevented. Where the receiver is so designed that the antenna level display mode is established when the picture of a BS broadcast fails to be displayed, it is easy to judge whether the cause is erroneous setting of the power switch 46 or not.

As can be understood from the description made thus far, in the novel television receiver, the antenna level is displayed on the display portion according to the output from the antenna level detector means, the display portion being designed to display a picture according to the output from the satellite broadcast reception tuner. At this time, the condition "ON" or "OFF" of the switching means is displayed on the screen together with the antenna level under the control of the display control means, the switching means being capable of cutting off the electric power supplied to the satellite broadcast reception converter from the power supply means. Therefore, it is easy to know the condition of this switching means. Normally, whenever the BS antenna is installed, the receiver is placed in the antenna level display mode. Consequently, the condition, i.e., ON or OFF, of the switching means for cutting off the electric power supplied to the satellite broadcast reception converter can be checked with certainty. This assures that incorrect setting of the output from the power supply means is prevented.

What is claimed is:

1. A television receiver comprising:
   power supply means for supplying electric power to an external satellite broadcast reception converter arranged externally to the television receiver;
   a satellite broadcast reception tuner connected to receive signals from the external satellite broadcast reception converter, electric power supplied by said power supply means to the external satellite broadcast reception converter being fed through said satellite broadcast reception tuner;
   a display portion on which a picture can be displayed;
   control means connected to said power supply means and said display portion for controlling operations thereof;
   power switch means connected to said control means for cutting off the electric power supplied from said power supply means to the external satellite broadcast reception converter through said satellite broadcast reception tuner, said control means being responsive to a state of said power switch means;
   antenna reception level detection means connected to said control means for detecting a reception level at an external broadcast satellite antenna connected to the external satellite broadcast reception converter according to an output of a selected channel from said satellite broadcast reception tuner and supplying an output signal generated therefrom to said control means, wherein the reception level detected at the external satellite broadcast antenna and the ON or OFF state of said power switch means are displayed on said display portion;

a UHF/VHF tuner connected to receive signals from an external UHF/VHF antenna and to output a tuned UHF/VHF signal;

an external output terminal receiving the selected channel from said satellite broadcast reception tuner and feeding it to an external decoder;

an external input terminal receiving a decoded signal from the external decoder; and a video switch for selecting either said decoded signal supplied by the external decoder through said external input terminal, said tuned UHF/VHF signal from said UHF/VHF tuner, or said selected channel from said satellite broadcast reception tuner and supplying the selected signal to said display portion.

* * * * *